Aug. 23, 1932.  H. ERNST  1,872,709

GASKET

Filed May 13, 1929

Inventor
HANS ERNST
By HHParsons
Attorney

Patented Aug. 23, 1932

1,872,709

UNITED STATES PATENT OFFICE

HANS ERNST, OF CINCINNATI, OHIO, ASSIGNOR TO THE CINCINNATI MILLING MACHINE COMPANY, OF CINCINNATI, OHIO, A CORPORATION OF OHIO

GASKET

Application filed May 13, 1929. Serial No. 362,553.

This invention relates to improvements in gaskets and to the process of production thereof.

One of the objects of the present invention is the provision of an improved gasket, particularly adapted for use in connection with hydraulic transmissions or other high pressure lines, which will form a maximum effective seal between the parts of a machine tool or the like between which the same is necessarily interposed.

A further object of the present invention is the provision of an improved type of relatively rigid and non-yielding gasket, which may be satisfactorily employed in those instances where a number of small apertures in feed lines or other machine tool parts must be coupled through the gasket and which will serve to satisfactorily seal the joint around such small apertures and prevent high pressure leakages throughout.

A further object of the invention is the provision of a substantially homogeneous gasket structure having an inherent capacity for compression yield, to adapt itself to irregularities in the surface of an abutting part to seal the jointure therewith.

An additional object of the present invention is the provision of an improved process of manufacture or production of a gasket which will satisfactorily fulfill the foregoing purposes.

Other objects and advantages of the present invention should be readily apparent by reference to the following specification, considered in conjunction with the accompanying drawing illustrative of one embodiment of the invention, and it is to be understood that any modifications in the specific structural details or process of manufacture, hereinafter described, may be made within the scope of the appended claims, without departing from or exceeding the spirit of the invention.

Figure 1:
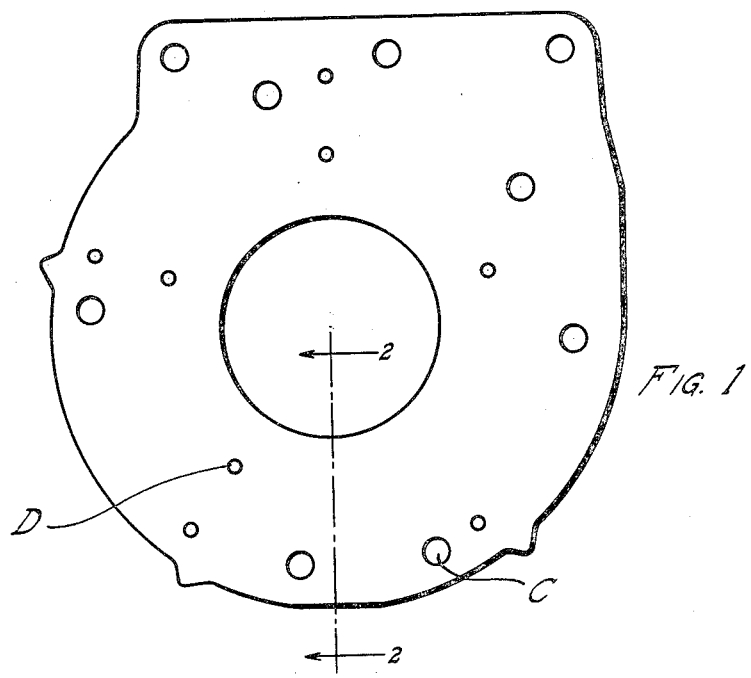
Figure 1 represents a plan view of a gasket embodying the invention.

In the production of machine tools, including milling machines, presses and the like, at the present day, use is increasingly being made of hydraulic means in place of mechanically actuating or power applying mechanisms therefor and the pressures developed are frequently several thousand pounds to the square inch as respects the hydraulic actuating medium. Due to the nature of such machine tools, the several parts thereof must be separately produced and subsequently jointed in such manner as to provide suitable channels or conduits for the actuating pressure. For efficiency of operation of the machine and to avoid undue power losses, overheating, irregularity of operation and the like, it is essential that possibility of leakage be reduced to a minimum and that some means be provided for sealing the joints or connections between the several parts of the tool under pressures of this nature. Among desiderata for a gasket or sealing medium in this connection are that the same have a stable or relatively non-yielding body portion, which may be formed with apertures of desired size, either large or small, according to the conduits to be coupled therethrough, which will not blow out between ports or apertures inter-connecting the same or to the outer edge, and which will at the same time have sufficient surface yield possibilities to accommodate itself to irregularities of the surface abutting thereagainst to closely interfit therewith and provide a satisfactory seal against pressure escapement. This yielding action must be effective under the normal clamp pressure provided by ordinary bolts or similar securing means. The present invention, therefore, relates to the process of producing a gasket which will satisfactorily fulfill the foregoing requirements, and to the article as produced by said process. The resultant product of my improved process is illustrated in the drawing and comprises a central body portion A, having on each side thereof a coating B. This coating has been stippled to indicate that it is an integral homogeneous mass of varying density from the center or body portion A to the outer surface thereof. As illustrated, it is shown provided with the series of bolt or fastener receiving apertures C and conduit ports or passages D.

Figure 3:
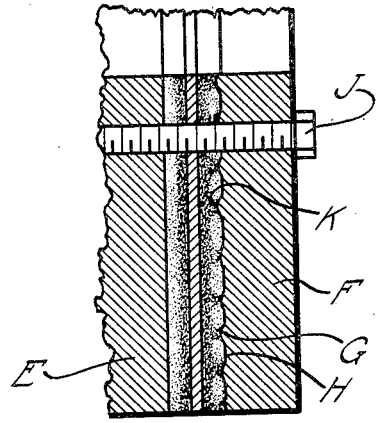
Figure 3 is a section illustrating the gasket under service conditions.

In Figure 3 the use of the same has been illustrated as disposed between an abutting member such as a machine tool part E and a second member F. The member E has a smooth finish abutting surface, while the member F has a more rough or irregular surface, forming the projections G and depressions H. The parts E and F are shown as drawn together by the screw or bolt J. Particular attention is invited to the fact that as the parts are drawn together, the projections G imbed themselves in the surface of the portion B of the gasket, causing an increase of density thereof, as indicated at the points K, so that there is a close interlock or interfit betwen the surfaces, of a nature to resist pressure escapement.

In the production of the gasket, I prefer to form the body from copper and immerse same in a suitable tin plating bath to cause electrodeposition of the tin on the surfaces of the copper center A. As the plating progresses, the actuating current is increased, whereby a progressively varying density of electroplating is produced on the sides of the body member A, homogeneous in character but varying, either in step by step form or progressively, as respects density, from center to surface. As a result, the outer portion of the surface having this density will possess greater capacity for yielding or compression when contacting with irregularities and will, with greater facility, conform thereto to establish a tight seal. From the foregoing description, considered in connection with the accompanying drawing, the process of producing the improved gasket should be readily understood and it will be seen that by the practice of this process I have provided an improved article of manufacture, including a central carrier or body portion which may be relatively hard and is provided with softer or more compressible abutting surfaces, which vary either progressively or in step by step manner in decrease of density and, therefore, increase of yieldability under compression from center to surface. It will further be noted that on account of the integral union of the center and surface portion of the gasket and the homogeneous nature of the latter, blowing out of the gasket, such as occurs with filled gaskets or the like, is entirely eliminated and, at the same time, a greater capacity for conformity to the adjacent abutting surface is attained.

Figure 2:
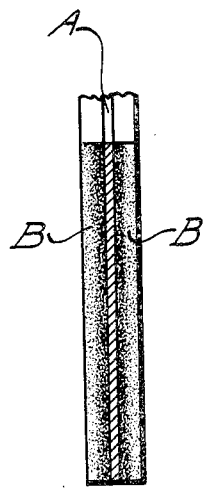
Figure 2 is a section on line 2—2 thereof.

While the gasket has been primarily described as of varying density from center to surface, it is to be understood that this has been emphasized as producing in relatively non-yielding material a greater capacity for adjustment to irregular surfaces. In some instances, however, a uniform deposit of a density corresponding, for example, to the illustrated outer density of the material in Figure 2, may be utilized or, in place of the material mentioned such as tin, use may be made of lead or other substance of substantially uniform density but of sufficient compressibility or pressure distortability that the surface material will flow or accommodate itself to the several surface irregularities of the machine part in engagement therewith, and form an absolutely tight interlock, preventing pressure escape. These structures, in each event, possess the advantage and characteristic feature of a gasket member having a relatively rigid or non-distortable central body portion and of suitable metallic material having integrally united therewith or formed thereon a surface coating of a more yieldable or displaceable material capable of surface distortion, dependent on the member in pressure engagement therewith.

I claim:

1. A gasket member comprising a relatively incompressible central portion having integrally united therewith surface portions of gradually decreasing density from center to surface thereof.

2. A high pressure gasket member comprising a central copper portion having on its surfaces an electroplated tin layer of gradually decreasing density from center to surface.

In testimony whereof I affix my signature.

HANS ERNST.